United States Patent
King et al.

(10) Patent No.: US 6,295,024 B1
(45) Date of Patent: *Sep. 25, 2001

(54) AUTONOMOUS DATA AIDED GPS SIGNAL ACQUISITION METHOD AND SYSTEM

(75) Inventors: Thomas M. King, Tempe; Issac N. Durboraw, III, Scottsdale, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/253,318

(22) Filed: Feb. 19, 1999

(51) Int. Cl.[7] ............................... G01S 5/02; H04B 7/185
(52) U.S. Cl. .......................... 342/357.12; 342/357.06; 701/213
(58) Field of Search .................... 342/357.06, 357.12, 342/352; 455/12.1; 701/213

(56) References Cited

U.S. PATENT DOCUMENTS

| | | |
|---|---|---|
| 5,148,452 | 9/1992 | Kennedy et al. . |
| 5,663,734 | 9/1997 | Krasner . |
| 5,781,156 | 7/1998 | KRASNER . |
| 5,809,064 * | 9/1998 | Fenton et al. .................. 375/208 |
| 5,901,183 * | 5/1999 | Garin et al. .................... 375/343 |

\* cited by examiner

*Primary Examiner*—Dao Phan
(74) *Attorney, Agent, or Firm*—Nicholas C. Hopman; John J. King

(57) ABSTRACT

A data-aided system and method of GPS signal acquisition from a plurality of broadcasted GPS signals includes receiving (401) the GPS signals and providing a digitized signal. Then, a first portion (407) of the digitized signal is correlated to a code replica and a real-time code phase delay is determined. A capture start time is determined (411) dependent on a Time Of Arrival (409) based on the determined real-time code phase delay. Next, a second portion of the digitized signal is captured into a memory (413) commencing coincident with the determined capture start time. Then the second portion of the digitized signal is extracted from the memory and correlated to the code replica (411) to determine an off-line code phase delay. A position fix is calculated (417) and includes the off-line code phase delay.

34 Claims, 10 Drawing Sheets

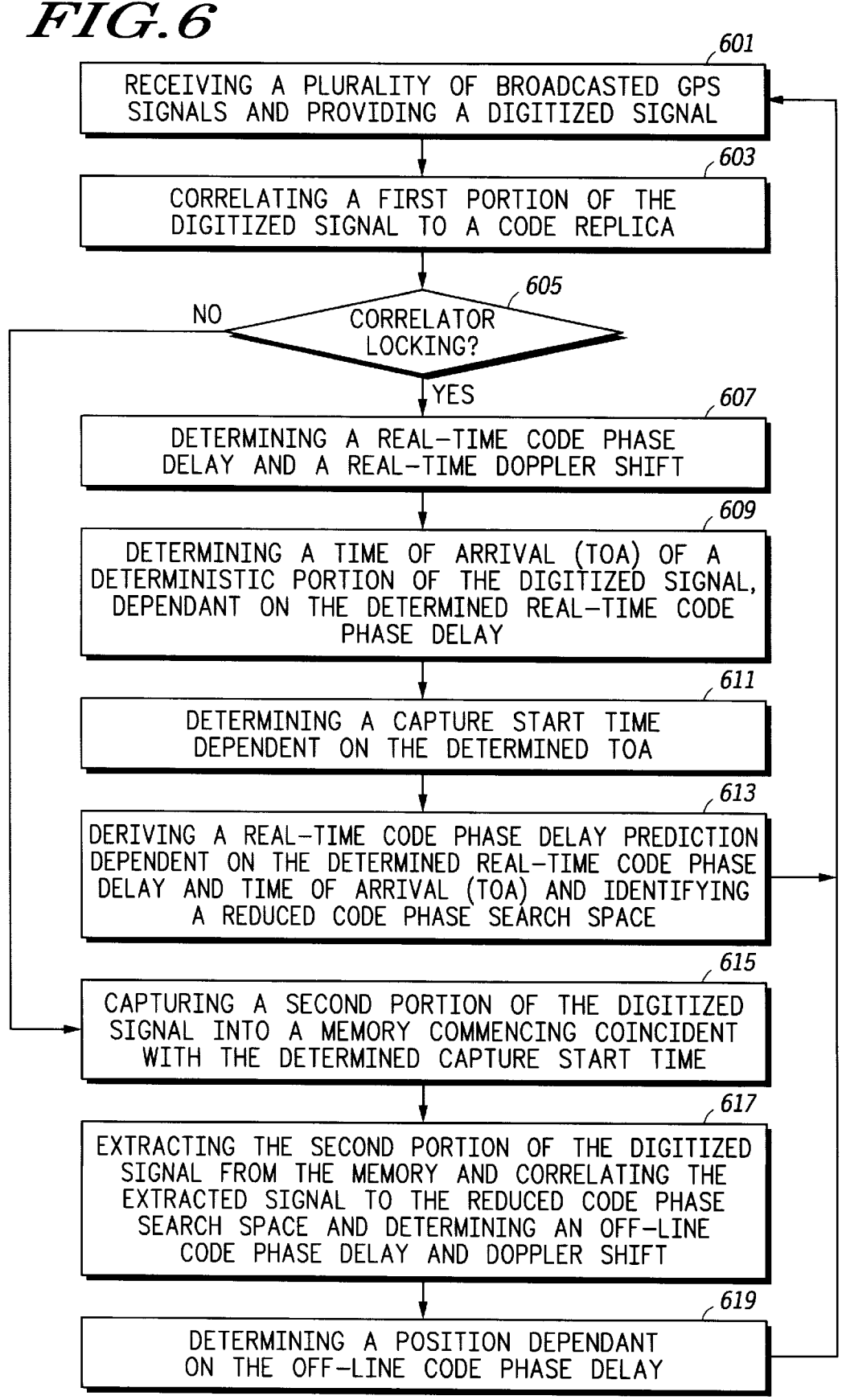

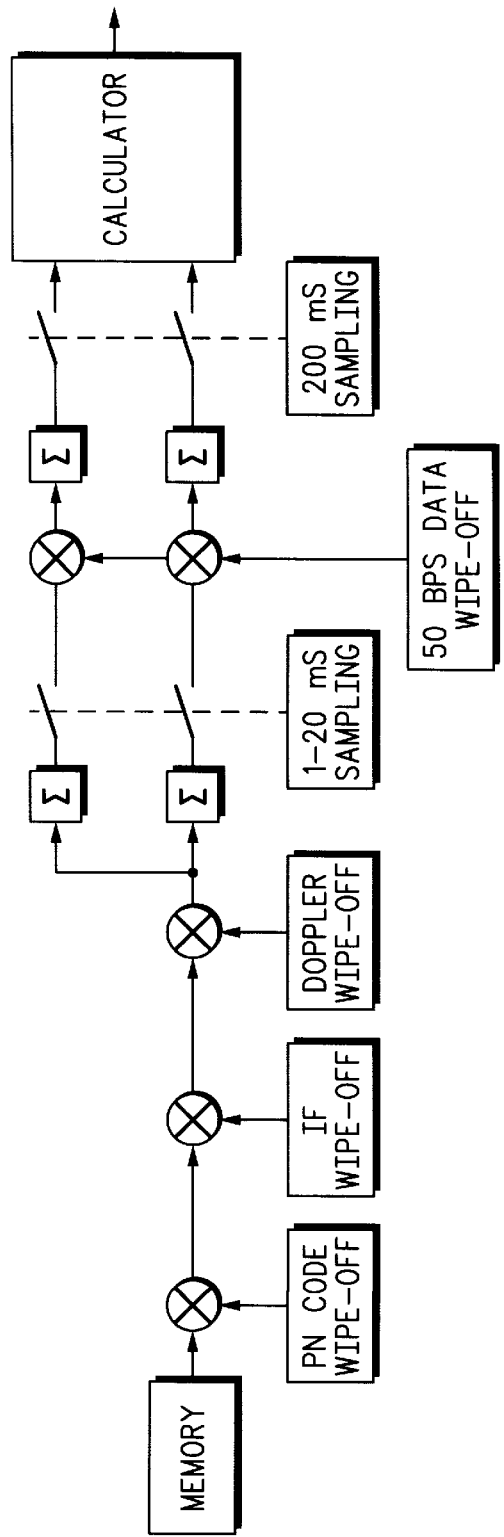
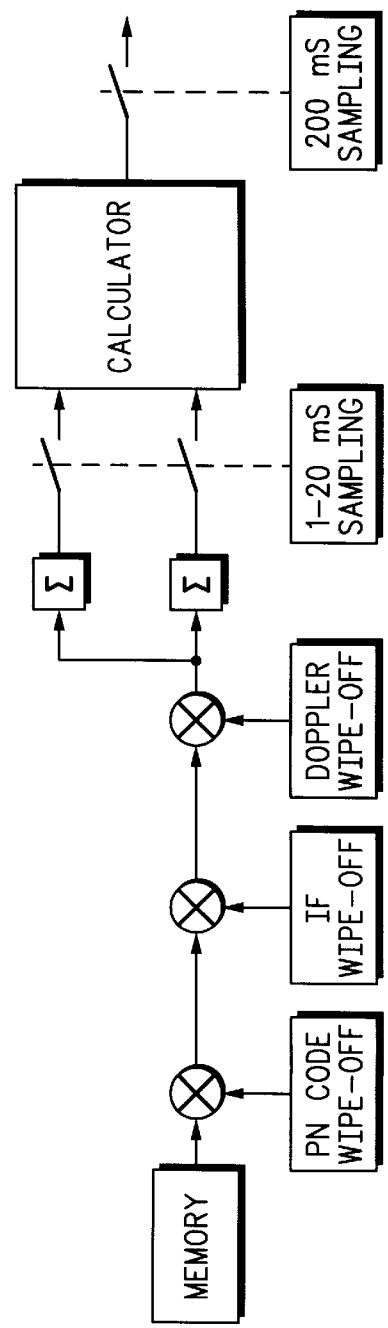
FIG.8
FIG.9

AUTONOMOUS DATA AIDED GPS SIGNAL ACQUISITION METHOD AND SYSTEM

FIELD OF THE INVENTION

The present invention relates generally to Global Positioning System (GPS), and more specifically, to improved signal detection acquisition time, low level signal detection, and energy conservation for GPS receivers.

The present invention is related to U.S. patent application Ser. No. 09/253,662 FIXED SITE DATA-AIDED GPS SIGNAL ACQUISITION METHOD AND SYSTEM, Seymour et al. And U.S. patent application Ser. No. 09/253,679 FIXED SITE AND SATELLITE AND DATA-AIDED GPS SIGNAL ACQUISITION METHOD AND SYSTEM, Seymour et al., both of which were filed on the same date herewith and are assigned to the assignee of the present invention, and both of which are incorporated herein by reference.

BACKGROUND OF THE INVENTION

According to the Federal Communications Commission (FCC) cellular telephone calls be geographically locatable by the year 2001. This capability is desirable for emergency systems such as E911. The FCC requires stringent accuracy and availability performance objectives and demands that cellular telephones be locatable within 125 meters 67% of the time. This threshold has been difficult to achieve using traditional GPS TOA/TDOA (Time Of Arrival/Time Difference Of Arrival) infrastructure technology.

In order to include GPS in wireless portable devices such as cellular telephones, performance needs to be improved in several areas including weak signal detection, acquisition time and energy use for operating power. Regarding weak signal detection, users of cellular telephones have become accustomed to making calls indoors, and traditional processing of GPS signals will not accommodate the attenuation caused by most buildings. Since these GPS receivers capture signals from satellites at quite an extraordinary distance, any objects in the direct line of sight between the GPS receiver and the satellites often cause malfunction because the signal transmitted by the satellites is attenuated by the interfering object making it difficult for the GPS receiver to receive them. Trees, buildings, and other high-profile objects can cause line of sight interference resulting in the problem of weak, or low signal detection.

Regarding accuracy, differential GPS approaches may work but are complex and costly. Moreover they don't fix the weak signal problem.

A major problem with traditional GPS signal processing techniques has to do with bandwidth and signal power. The GPS satellites transmit a very weak signal, guaranteed signal levels are only −130 dBm on the surface of the earth. Actual signals as measured on the earth's surface show signal levels of about −125 dBm. The acquisition threshold of current automotive and consumer grade handheld GPS receivers is on the order of −137 dBm, thus the link margin for signal acquisition is only about 7 to 12 dB.

The sequential detection algorithm is used my almost every GPS receiver on the market in order to acquire the CDMA signals. One can extend the acquisition threshold to lower levels by lengthening the pre-detection integration (PDI) interval at the expense of acquisition time. Even so, there is a maximum PDI of about 10 milliseconds (100 Hz bandwidth) beyond which the sequential detection process breaks down. This is because the GPS signal structure includes BPSK modulated navigation data (50 BPS) transmitted on top of the 1.023 MHz spreading code that ultimately limits how long one can coherently integrate in order to increase the SNR. Beyond 10–20 ms (one data bit time), the data bit transitions cause the integration sum to be reduced or go to zero, depending on the phase relationship of the integration period relative to the data bit transition.

Also, contemporary Global Positioning System (GPS) receivers are often embedded within portable devices where energy is derived from a battery. These portable devices include devices such as cellular telephones, PDAs (Personal Digital Assistants), portable computers, surveying devices and other devices that make use of information provided by a GPS receiver. When these GPS receivers operate, they consume a substantial amount of energy, which depletes energy from the battery that could be made use of by the co-embedded functions. If GPS correlation can be done faster, battery energy can be conserved because the GPS receiver can be turned off when correlation is achieved. Prior art schemes have inadequately addressed energy conservation.

What is needed is an improved GPS signal acquisition method and system, that can operate with weaker signals, lock onto satellite signals fast, and operate with a lower energy usage than prior art schemes.

BRIEF DESCRIPTION OF THE DRAWINGS

FIG. 6 is a flow chart showing method steps corresponding to another embodiment that uses one correlation process to reduce code phase search space for another correlation process;

FIG. 8 shows a signal processing block diagram of a coherent integration process;

FIG. 9 shows a signal processing block diagram of a non-coherent integration process;

DETAILED DESCRIPTION OF THE PREFERRED EMBODIMENT

An improved system and method of GPS signal acquisition based on a data-aided approach is described. The described approach extends an acquisition threshold to lower levels by lengthening the pre-detection integration (PDI) interval at the expense of acquisition time. To accomplish this, a portion of the broadcasted GPS signal is captured into a memory and then later replayed into a GPS correlator. Since, to get maximum benefit from this approach the GPS correlator needs to be operating on a coherent signal, the capture of the GPS signal must be well controlled. Coherent signal capture is an important aspect of a preferred embodiment. Non-coherent signal processing can also be useful in the data-aided coherent signal approach and such and embodiment is also detailed. Another embodiment applies a first correlator to aid a second correlator to reduce acquisition time for correlation lock for the second correlator. Other benefits of the described embodiments include optimal energy conservation and faster signal acquisition time.

Before the details of a method embodiment of the improved approach are detailed a description of a system platform will be detailed.

Figure 1:
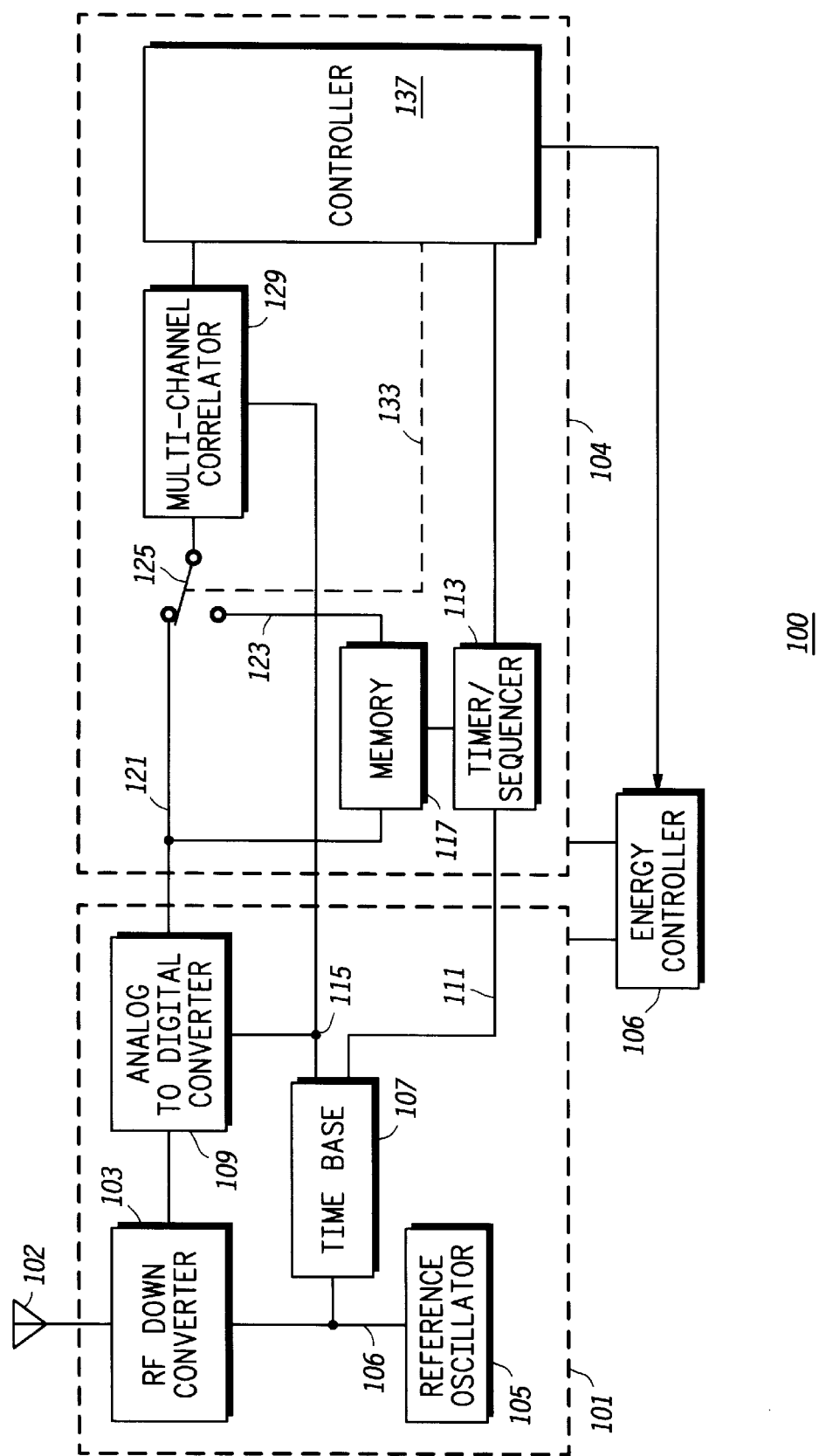
FIG. 1 is a system block diagram of a GPS receiver in accordance with a preferred embodiment of the invention.

A system block diagram of a GPS receiver 100 capable of detecting signals at greatly reduced levels is shown in FIG. 1. A GPS front-end 101 includes an antenna 102 coupled to an RF (Radio Frequency) down converter 103. The RF down converter 103, under the direction of a reference oscillator 105 drives an analog to digital converter 109. The RF down converter 103 receives GPS signals broadcasted by any of several satellites in sight, and a time base 107 schedules the analog to digital converter 109 to provide a digitized signal 121. The digitized signal is an Intermediate Frequency (IF) signal.

A computational back-end 104 includes a memory 117 coupled to the analog to digital converter 109 for receiving the digitized signal 121. A timer/sequencer 113 receives a timing reference signal 111 from the time base 107, and under direction of a controller 137 directs the memory to capture the digitized signal 121 and replay it to a multi-channel correlator 129 at a determined time. The time base 107 also provides a timing signal to direct the operation of the analog to digital converter 109 and the correlator 129. Note that the correlator is a multi-channel correlator as is conventional in GPS receivers. Each channel of the multiple channels tracks a particular satellite signal extracted from the digitized signal 121. A switch 125, actually one for each channel of the correlator 129, under control of the controller 137, via a selection signal 133, is configurable to provide either the digitized signal 121 or a signal 123 played back from the memory 117.

Once a satellite signal is captured into the memory 117, correlation can be used to search for the signal of interest using the known 50 BPS data pattern as a basis for data-aiding the acquisition algorithm and thus extending the acquisition threshold well below that previously possible.

When the received satellite signals are strong, standard GPS signal processing algorithms can be used to acquire and track the satellites continuously. Upon loss of conventional signal tracking due to urban canyon, foliage, or other blockage conditions, the switch mechanism 125 for the affected satellite channel can be selected to observe a recently recorded signal sample, and a data aided, or off-line correlator, can be used to scan for the signal at greatly reduced detection thresholds. Note that in certain applications, the receiver likely has already obtained the entire 50 BPS navigation message and thus already has pre-stored all the data and can use it to data-aid the acquisition of the signal stored in the memory 117. The signal can then be reacquired directly once the code phase and Doppler shift are obtained, or the data aiding scheme can obtain direct measurements of pseudorange.

It is important that any correlation channel be able to observe either the direct output (i.e., the real-time output) of the analog to digital converter 109 or the captured and stored output of the memory 117. It is also important that any channel be switchable to run at real-time speeds or at much faster than real-time speeds.

Received satellite signals can be captured into the memory 117 at a rate no slower than twice the PN code-chipping rate of 1.023 MHz, in order to preserve the signal's information. That is, the input to the memory 117 must be at least 2.046 MHz. Likewise, in playback mode, it should be easily recognized that the data can be played back from the memory 117 into the correlator at a rate that is much faster than the collection rate since the correlation process is then handled in a post-collection mode. Thus, the correlator can be run at rates that coincide with the fastest possible data rate supportable by the implementation of the correlator 129 and memory 117.

Typical CMOS circuits can easily process data from the memory 117 and the correlator at rates that are 10–100 times faster than that required to originally collect the data. That is, the correlator 129 and the memory 117 can operate at 20–200 MHz typically, causing an increase in the processing speed of 10–100 times that of the real-time process. Rapid signal detection can be achieved using this speed up process in playback mode. Since the bandwidth of the frequency space is about 5–10 Hz (given that a 100–200 millisecond long batch of data is stored in memory), the number of parallel search frequency bins is greatly increased. Therefore an approach for greatly increasing a rate at which the frequency bins can be checked is needed. In addition, the parallel channels of the correlator 129 that are used can also be used to speed up the frequency search process. Where typical correlators now contain up to 12 channels of independent correlators, it is possible to look for a limited number of satellites initially, using channels to search in parallel for the same satellite at either different Doppler frequencies or at different code phase delays.

The number of bytes of memory 117 establishes the maximum PDI that one can achieve, and therefore the signal processing gain that is available. Given a 1 bit sampler (one each for I and Q), and a sample rate of 2.1 MHz, Table 1 describes the sample interval size based on several conveniently sized memory 117 blocks.

| Memory size (bytes) | Sample Interval (milliseconds) |
| --- | --- |
| 8K | 15.6 ms |
| 32K | 62.4 ms |
| 128K | 249.7 ms |

Several things limit the practical application of this approach. First, there is a practical limit to the amount of memory 117 that can be included in a low cost implementation. Second, as one lengthens the PDI, there is a narrowing of the effective bandwidth (to 1/PDI). As one narrows the frequency search bandwidth, more frequency bins are created that have to be tried during the two-dimensional detection scan over the code/frequency space. This increases the time to search for and lock onto the satellite signal. Third, the stability of the reference oscillator can also come into play at longer integration times if the bandwidth is narrowed enough to approach the short-term stability of practical low cost oscillators. For these reasons, a practical integration time of approximately 200 milliseconds (bandwidth of 5 Hz, corresponding to ten bits of the 50 BPS data message) is used here, and results in 24 dB of signal detection gain over a conventional GPS receiver. A memory size of 128K bytes provides almost 250 milliseconds of data-capture time. This gives enough signal overlap on the front and back end of the memory to capture the same 10 bits from every visible satellite (allowing for propagation delay differences due to geometry and for the drift in each satellite reference clock). Efficient code/frequency space search algorithms are required at this level in order to find the signals in a relatively short period of time.

The described architecture is ideal for inclusion into wireless portable devices because the entire receiver can be powered off until a position fix is needed, and it provides the necessary signal processing gain for in-building operation and to overcome poor performance antennas. When a position fix is required, the GPS can be powered on, a memory sample taken at a time coincident with the arrival of the known data bits. Once the memory contains the sample, the GPS front-end can be powered off. The data-aided correlator is then powered and used to measure the code phase delays of all visible satellites in a matter of a few seconds. The code phases can then either be transmitted to a remote location for position fix computation, or a position fix can be computed locally. Offline position calculations are often done to implement differential correction which compensates for satellite emepheris and other system errors.

Returning to the description of FIG. 1, an energy controller 106 under the direction of the controller 137 manages energy provision to both the GPS front-end 101 and the computational back-end 104. After the computational back-end captures the digitized signal 121 into the memory 117 the energy controller 106 can shut down the GPS front-end 101. After the GPS receiver 100 either finds a position fix or after it transmits the code phase delays back to a fixed position reference site the energy controller 106 can shut down the computational back-end 104. This type of energy conservation is particularly critical in portable devices such as cellular radiotelephones and other hand-held devices. Next, information contained in the GPS satellite signal will be described.

Figure 2:
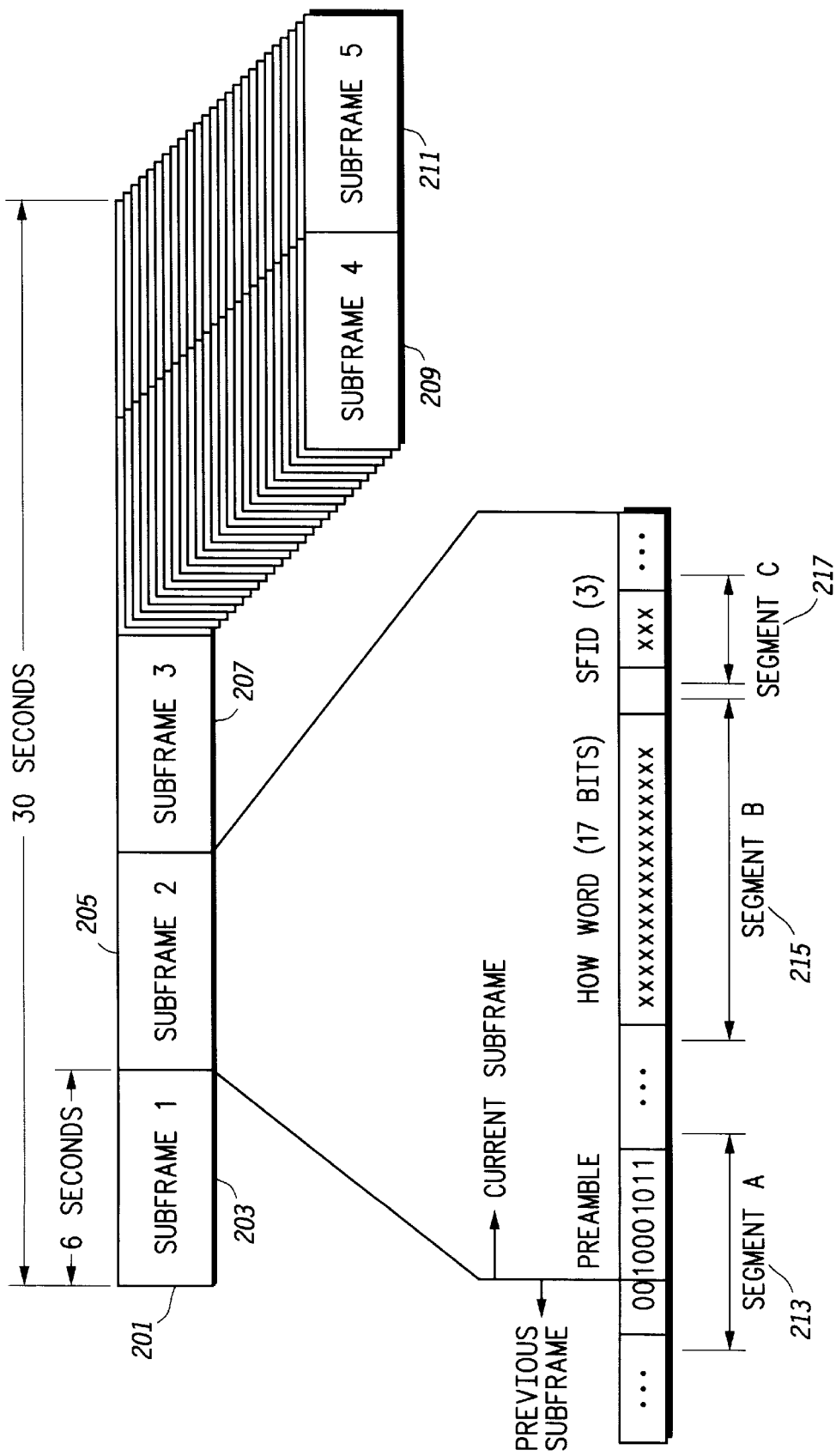
FIG. 2 is a diagram of a GPS satellite broadcast message.

FIG. 2 shows the message structure of a 50 BPS data sequence as transmitted by every GPS satellite. Each frame 201 is continuously broadcasted and consists of six second subframes 203, 205, 207, 209, and 211. Note that subframes 4 and 5, 209 and 211 respectively each have twenty five pages of data. Subframe 1 203 contains satellite clock correction coefficients, various flags and the age of the data. Subframe 2 205 and subframe 3 207 contain satellite ephemeris parameters. Subframe 4 contains an ionospheric model, UTC data, flags for each satellite indicating whether anti-spoofing is on or off, and almanac data and health for any satellites in excess of 24 in orbit. Subframe 5 contains almanac data and health of the first 24 satellites in orbit.

At the beginning of each six second subframe is the same 10 bit preamble, segment A 213, which is attached to the message to allow a GPS receiver's message decoding software to find message synchronization.

Each satellite's message timing is synchronous with all others in the constellation, thus the time of arrival of the signals on the ground of all satellite preambles is approximately the same, and varies only by about 30 milliseconds. The variability is caused mostly by geometry induced differences in the propagation delays, but also includes a small but controlled time bias for each unique satellite clock.

Any or all of the message segments shown in FIG. 2 (among others) can be used to push the pre-detection integration period to greater than 1 bit time. The preamble sequence is the same for every satellite and repeats every six seconds. Similarly, the HOW, or hand-over word segment B 215 is a time identifier, and it represents a time of the first preamble bit of the next to arrive subframe. Every HOW word is different from the previous by one count, is the same for every satellite, and is predictable as a function of time. Thus, the 17 bit HOW word can also be used to generate known data sequences that can be used to greatly extend the detectability of the signal.

GPS receivers measure a time of arrival (TOA) of signals impinging its antenna from multiple satellites. The CDMA signal structure of the received signal offers a convenient method of measuring the TOA through a correlation process by measuring a code phase delay that produces a signal maximum. A code discriminator refines the code phase measurements around the signal peak before being used for position fix computation purposes.

Figure 3:
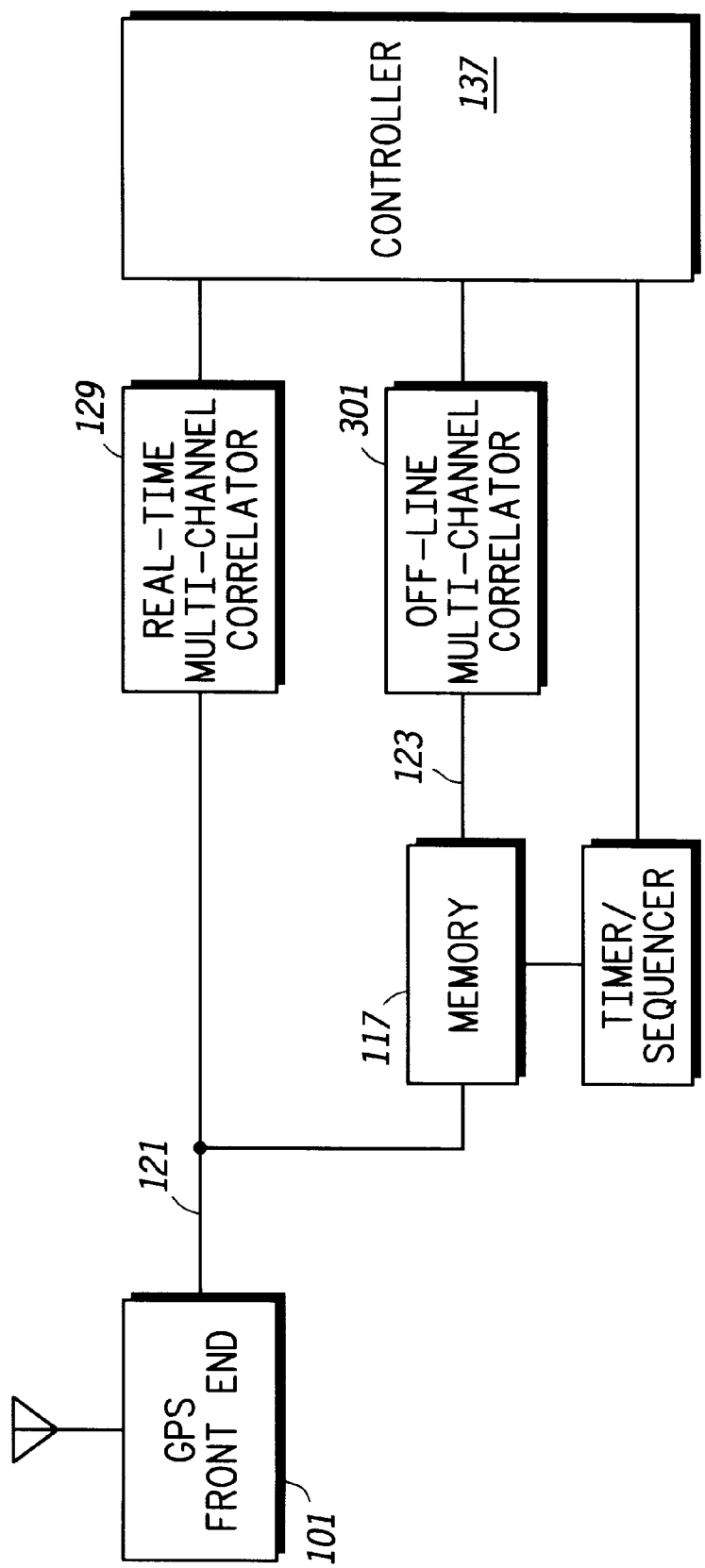
FIG. 3 is a system block diagram of an alternate platform for carrying out various method embodiments described herein.

FIG. 3 is a system block diagram of an alternate platform for carrying out various method embodiments described here. The GPS front-end described in FIG. 1 provides the digitized signal 121 to the correlator 129 and the memory 117. In this embodiment the signal 123 is played back directly into an off-line multi-channel correlator 301, rather than into the real-time multi-channel correlator 129 as shown in FIG. 1. The off-line multi-channel correlator 301 can be a hard-wired circuit, or a software correlator executable on a controller, for example, the controller 137 or another controller.

Figure 4:
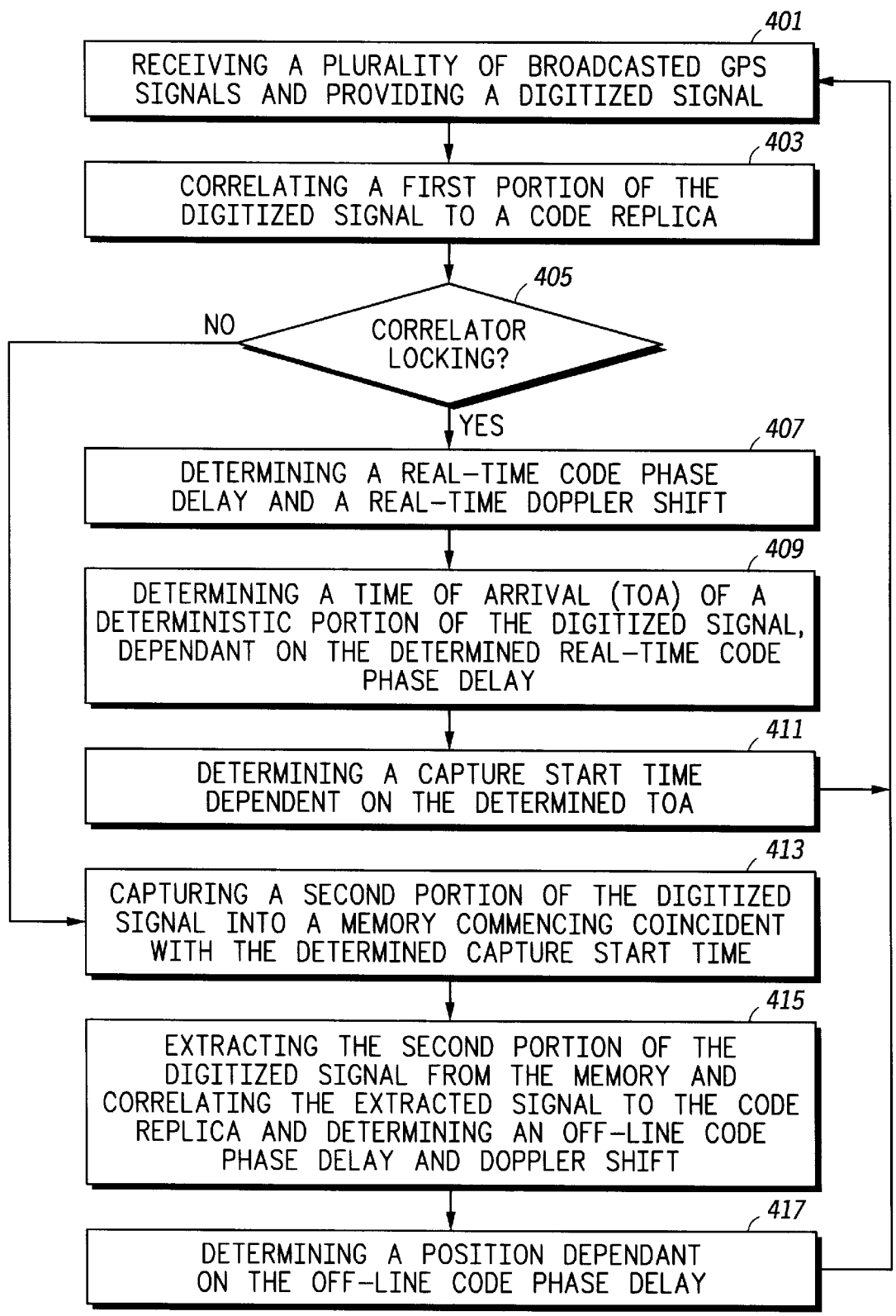
FIG. 4 is a flow chart illustrating preferred method steps.

FIG. 4 is a flowchart illustrating a method embodiment of the invention. The method steps shown in the flowchart are to be executed on the controller 137 shown in FIG. 1, or FIG. 3.

In step 401 the system 100 receives a plurality of broadcast GPS signals and provides a digitized signal. Referring back to FIG. 1 reference number 121 represents the digitized signal.

Next, in step 403 a first portion of the digitized signal 121 is correlated to a code replica that is stored in the controller 137.

In step 405 the controller 137 checks to see if the correlation process is locking-on to the digitized signal. To lock the correlation process must line up the first portion of the digitized signal to the code replica. If the signal 121 is too weak or the ambient noise level is too high the correlation process will not lock, and after a predetermined period of time allotted for correlation locking an off-line correlation process will be invoked commencing at step 413.

If the correlation process is locking on, then in step 407 a real-time code phase delay and a real-time Doppler shift is determined.

Then, in step 409 a Time Of Arrival (TOA) of a deterministic portion of the digitized signal is determined dependant on the determined real-time code phase delay. In the preferred embodiment the HOW, or hand-over word, is an example of the deterministic portion. Other portions of the satellite broadcasted 50 BPS data sequence are also deterministic and useable as well. For example, trailing bits of a first GPS satellite broadcast message sub-frame 203, and preamble bits of a second GPS satellite broadcast message sub-frame 205 immediately following the first GPS satellite broadcast message sub-frame 203 are also deterministic. Also, the SFID or SubFrame Identifier shown in segment C 217 qualifies as deterministic data.

Next, in step 411 a capture start time is determined dependent on the determined TOA. This capture start time will be used in the off-line correlation process. Then, the process returns to step 401.

If the correlation process is not locking for a particular satellite, as determined in step 405, the off-line correlation process commences at step 413. In step 413 a second portion of the digitized signal is captured into a memory 117 commencing coincident with the capture start time determined in step 411. This second portion includes one ore more of the deterministic data patterns described above, such as the message preamble, the HOW, or the SFID.

Next, in step 415 the second portion of the digitized signal is extracted from the memory and correlated to the code replica stored in the controller 137 and an off-line code phase delay and off-line Doppler shift is determined. The process of step 415 can be executed in software only in the controller 137 or can be executed using the multi-channel correlator 129. The second portion of the signal 123 is extracted from memory 117 and routed through a switch 125 under the direction of the controller 137.

The extraction of the signal 123 from the memory 117 and the correlation process, if the multi-channel correlator 129 is used, can be executed at a very high rate of speed typically 10 to 100 times the speed of the normal real-time correlation process. Because of this increased speed, using the off-line data correlation process, lock can be effected much faster than in a typical real-time correlation process.

In step 417 a position fix is computed dependent on the off-line code phase delay. Although a singular code phase delay is mentioned here, the position fix is computed from a multitude of code phase delays each associated with a different satellite. In practice separate channels of the multi-channel correlator 129 will resolve or lock onto each of these satellites. If a satellite drops out of lock using the real-time correlation process, then the off-line correlation process will be invoked for that satellite finding an off-line code phase delay and ultimately position fix. Because the real-time code phase delay is used to determine a capture start time for data to later be correlated via the off-line process, the correlation lock time can be significantly reduced and signal processing gain is inherently increased because a coherent off-line correlation process is used, coherency established based on the determined capture start time and known 50 BPS satellite broadcast data sequence.

Figure 5:
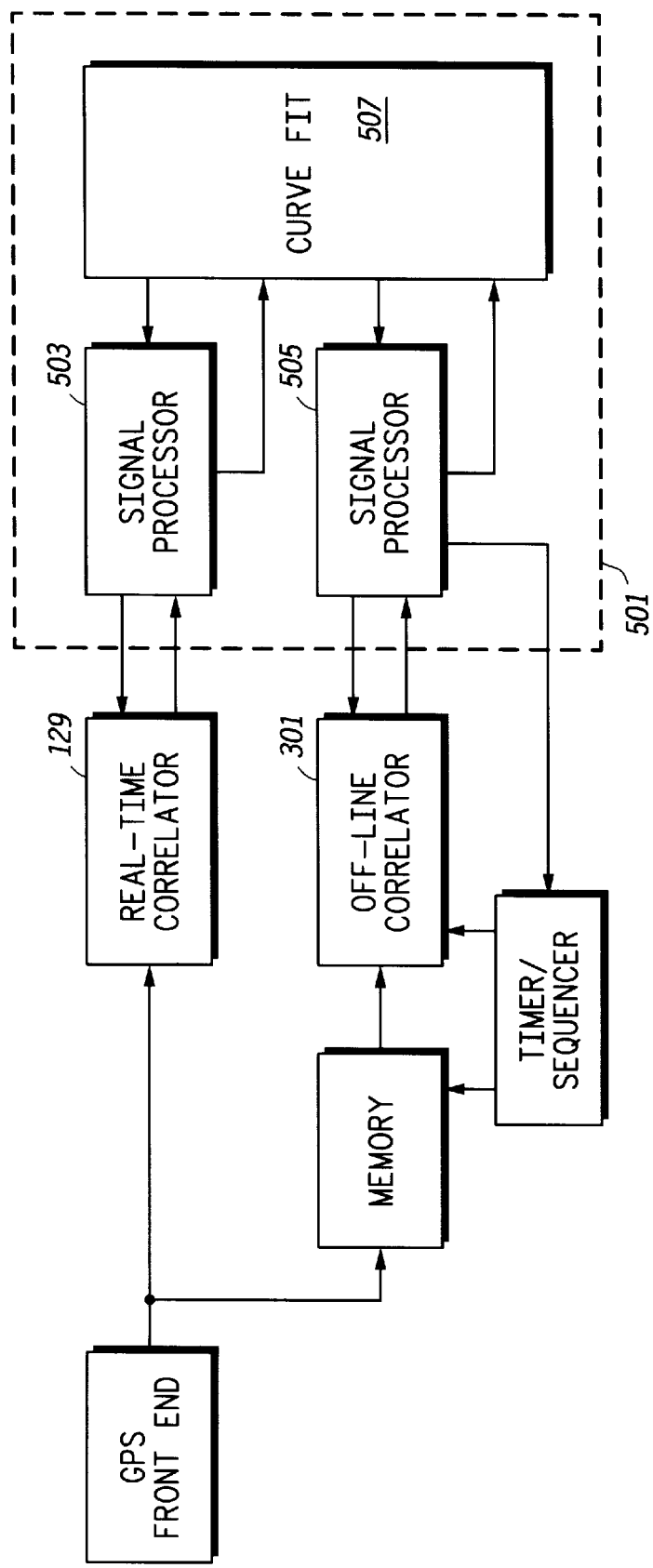
FIG. 5 is a system block diagram of another alternate platform for carrying out various method embodiments described herein.

FIG. 5 is a system block diagram of another alternate platform for carrying out various method embodiments described here. In this embodiment (including the method described in FIG. 6) a real-time correlator is used to significantly reduce code search space for an off-line correlator—making correlation lock much more expedient. Using this approach correlation lock time can be typically reduced from tens of seconds or minutes seconds to a few seconds. This is significant both for expedient response to emergency situations as well as efficient energy usage in portable products.

Returning to FIG. 5 a signal processing engine 501 is coupled to the real-time correlator 129 and the off-line correlator 301. The signal processing engine 501 includes a first signal processor 503, a second signal processor 505, and a curve fit function 507. It should be noted that processors 503, 505, and curve fit function 507 could be implemented as separate software algorithms within a single processor. Operation of this system is described in accordance with method steps outlined in FIG. 6. Essentially, a first satellite's code phase delay is measured and used to significantly reduce a code search space for an off-line correlated satellite signal. This makes acquisition of the off-line correlated satellite signal much faster and allows more efficient use of energy by the GPS receiver mechanism because it can be shut down sooner.

Referring to FIG. 6, in step 601 the system 100 receives a plurality of broadcast GPS signals and provides a digitized signal.

Next, in step 603 a first portion of the digitized signal 121 is correlated to the earlier described code replica.

In step 605 the controller 137 checks to see if the correlation process is locking-on to the digitized signal. After a predetermined period of time if the correlation process does not lock, then an off-line correlation process will be invoked commencing at step 615.

If the correlation process is locking on, then in step 607 a real-time code phase delay and a real-time Doppler shift is determined.

Then, in step 609 a Time Of Arrival (TOA) of a deterministic portion of the digitized signal is determined dependant on the determined real-time code phase delay.

Next, in step 611 a capture start time is determined dependent on the determined TOA. This capture start time will be used in the off-line correlation process.

Then, in step 613 a real-time code phase delay prediction is derived dependent on the determined real-time code phase delay and Time Of Arrival (TOA), and a reduced code replica search space is identified dependent thereon. The real-time code phase delay prediction is preferably derived using a predictive curve fitting function. Other prediction methodologies include linear interpolation of last measured code phase and code phase rate.

In step 615 a second portion of the digitized signal 121 is captured into the memory 117 in accordance with the determined capture start time.

Next, in step 617 the second portion of the digitized signal is extracted from the memory 117 and correlated to the reduced code replica search space, and an off-line code phase delay is determined. Since the real-time correlation process identifies a reduced code replica search space and a capture start time, an extremely efficient coherent off-line correlation process can be executed. Moreover, the off-line correlation process operates at faster than the real-time data will allow. The combination of these three improvement significantly reduces lock time from typically tens of seconds to a few minutes to a few seconds.

As mentioned earlier energy conservation is a critical design factor especially in portable GPS receivers. Energy conservation sometimes conflicts with performance, because a GPS correlation process must have power while trying to lock onto satellite signals, that the described approach greatly reduces the time and thus energy consumption to find the signal maximum correlation point.

Figure 7A:
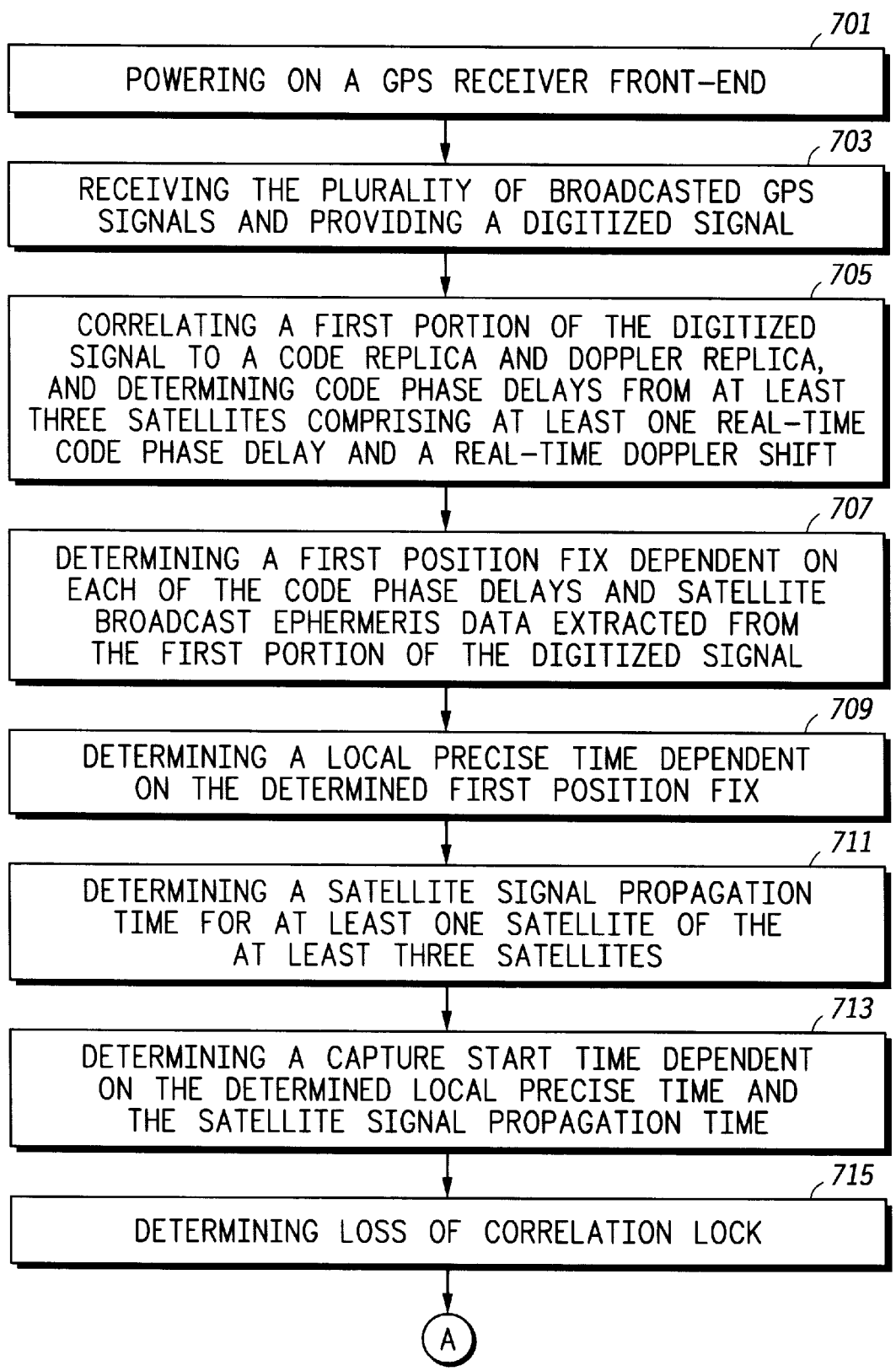
FIGS. 7A and 7B is a flow chart of preferred method steps illustrating an alternative embodiment of the invention directed toward energy conservation with fast correlation lock.
Figure 7B:
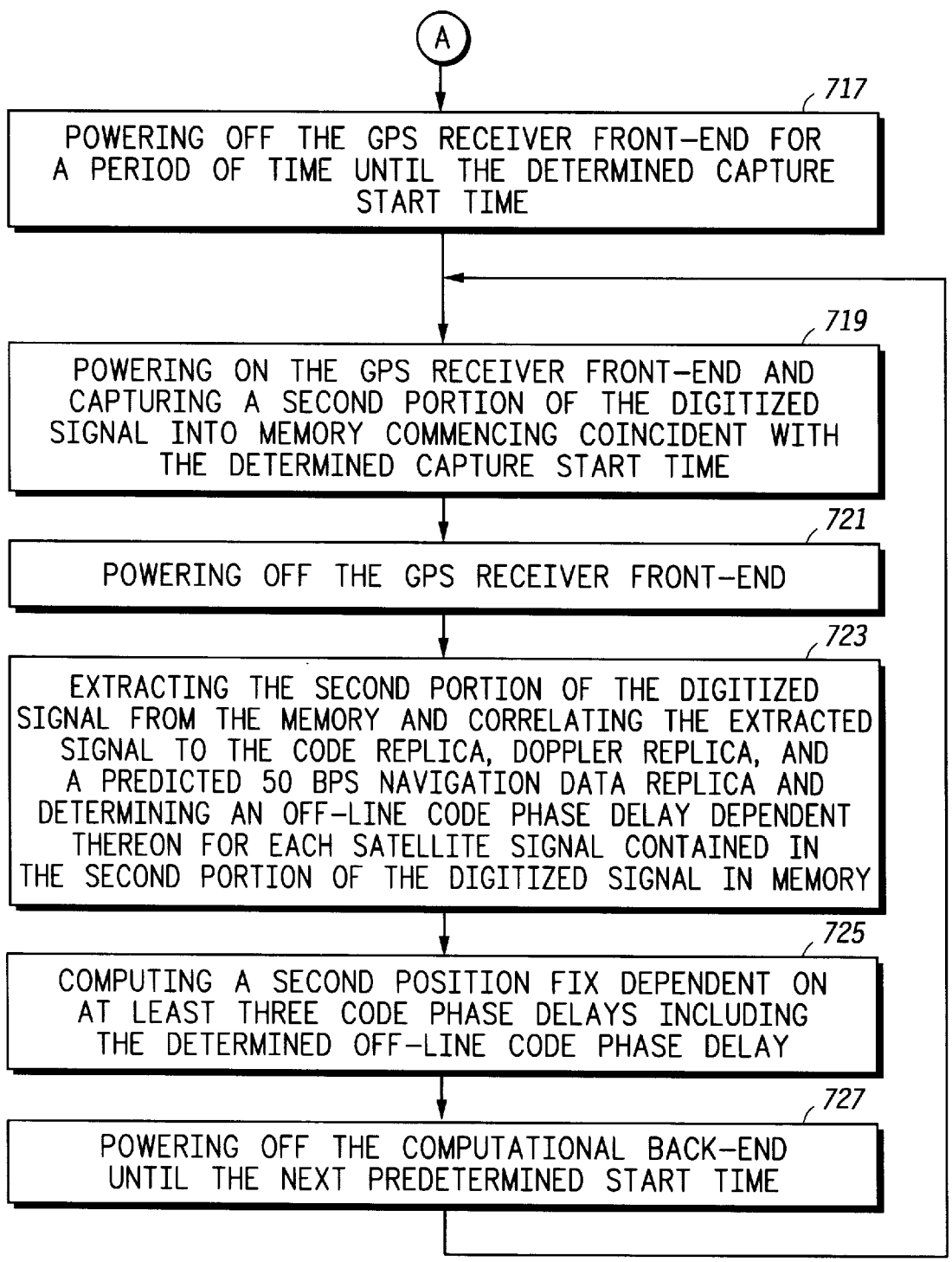

FIGS. 7A and 7B is a flow chart of preferred method steps illustrating an alternative embodiment of the invention directed toward energy conservation with fast correlation lock.

In step 701 the GPS receiver front-end 101 is powered on by operator request. In a portable device this can happen when the portable device is powered on.

Then, in step 703 the GPS receiver front-end 101 receives and digitizes GPS signals broadcasted from several satellites.

Next, in step 705 a first portion of the digitized GPS signal is correlated to a code replica and Doppler replica and code phase delays are derived from at least three satellites. At least one of the code phase delays is derived in real-time.

In step 707 a first position fix is computed using each of the code phase delays and satellite broadcast ephemeris data extracted from the first portion of the digitized GPS signal.

Then, in step 709 a local precise time is derived based on the first position fix.

Next, in step 711 a satellite signal propagation time is determined for at least one satellite of the at least three satellites, and a capture 713 a capture start time is determined dependent on the local precise time and the satellite signal propagation time.

Once a real-time fix is obtained from continuous and real-time track from multiple satellites, a lower power mode using only the off-line correlator and power cycling the RF and off-line correlator can be entered as follows. One thing that could trigger such a mode would be determining the loss of correlation lock on at least 1 satellite on the real-time multi channel correlator as shown in step 715. Alternately, the system could enter a power-saving and more sensitive signal detection mode at this step.

The energy controller 106 shown in FIG. 1 controls the powering of the GPS front-end 101 and the computational back-end 104 of the GPS receiver 100. In step 717 the GPS front-end 101 is powered off. Powering off the GPS receiver front-end is beneficial because it conserves energy—which is important in many devices particularly portable devices.

Moving to FIG. 7B, via connector A, the GPS receiver front-end is powered on in step 719 when the predetermined start time occurs. After being powered on, a second portion of the digitized signal is captured into the memory 117. After capturing the second portion of the digitized signal, the GPS receiver front-end is powered off in step 721.

Next, in step 723 the second portion of the digitized signal is extracted from the memory 117 and the extracted signal is correlated to the code replica, Doppler replica, and a predicted 50 BPS navigation data replica and an off-line code phase delay is determined for each satellite signal contained in the second portion of the digitized signal in memory.

Then, in step 725 a second position fix is computed dependent on at least three code phase delays including the determined off-line code phase delay.

Next, in step 727 the computational back-end 104 including the memory 117, multi-channel correlator 129, and microcontroller 137 can be powered down until the arrival of the next predetermined (i.e., periodic) start time occurs.

When the next predetermined start time occurs, the memory 117 can be powered again, and control is passed to step 719 where the process repeats indefinitely. The power saved is then proportional to the system on-time divided by the system off-time plus system on time. In this fashion, the system can produce position fixes at 6 second updates (the periodicity of the predetermined start times) with approximately 1 second of power-on time, thus the power consumption is reduced to $\frac{1}{6}^{th}$ of the original.

Next, another embodiment will be described. In this embodiment includes a non-coherent integration process. Before detailing the non-coherent integration process a coherent process will be reviewed from a signal processing viewpoint.

FIG. 8 shows a signal processing block diagram of the desired coherent integration process by which the known 50 BPS data bit sequence is used to extend the integration period past the 20 millisecond data bit time. A known data pattern coinciding with the special predictable or known data bits, such as the message preamble or the HOW word, for example, is used so that transmission of the entire 50 BPS data pattern is avoided. This technique provides 3 dB signal processing gain per doubling of the memory size and is the most efficient technique known to achieve such signal processing detection gain.

One drawback to such a system is that there is potential dead time in the signal processing because the system must wait for the known data patterns to appear into the input of the memory before it is captured in memory. Thus, synchronizing to the known data patterns may cause delay in the start of the signal processing function. For example, the sub-frame preamble field only occurs every 6 seconds. Thus, the time it takes for the function to find maximum correlation is tied to the wait time plus the search time, the search time is that time required for the system to find the precise PN code phase delay and Doppler so as to maximize the signal power output.

To reclaim this wasted time one technique that can be employed is shown in FIG. 9.

This technique uses a less precise and less sensitive non-coherent integration process in which knowledge of the 50 BPS data pattern is not required, but for which the total signal processing gain is reduced. It is known that non-coherent signal processing gain provides about 2–2.5 dB per doubling of the memory size, thus will provide a range measurement with higher signal to noise.

The preferred embodiment is to use a combination of the two techniques so that the dead time before the desired target known 50 BPS data sequence is capturable for the coherent process is not wasted. Specifically, the steps include:

Capture of an IF sample in memory that is earlier in time than the arrival of the target capture bits.

Use the non-coherent integration process to find the signal Doppler and Code Phase that maximizes signal energy output.

Wait for the target data segment with the known data pattern that can be used for coherent integration.

Capture the target data segment into memory.

Use the Code phase and Doppler data obtained from the non-coherent process to predict the time of arrival of the deterministic data, thus greatly shortening the time to find the coherent signal maximum.

Through these steps, the total time to find the coherent signal maximum is reduced because the non-coherent process that runs early on allows the system to greatly reduce the search time.

The output of the non-coherent integration process (i.e., the code phase and Doppler) can be used to compute position fix, but the measurements contain more noise than a coherent correlation process. More precise measurements are available with the coherent process due to the additional signal processing gain (and thus lower signal to noise ratio). The non-coherent process up front allows for the signal to be pre-searched if there is there is sufficient time ahead of the time of arrival of the target interval, thus making the precise measurement available earlier.

Here is an example of how to use the non-coherent code phase and Doppler measurements from the non-coherent process.

Let Ta be the sample time of the early memory capture event.

Let Cpa be the code phase measured from the early non-coherent process.

Let Da be the Doppler measured from the early non-coherent process.

Let Tb be the target sample time of the time of arrival of the target coherent data bits.

Then, the predicted code phase and Doppler at Tb is given by:

$$Cpb=Cpa+Da(Tb-Ta)$$

where: Db=Da

Figure 10:
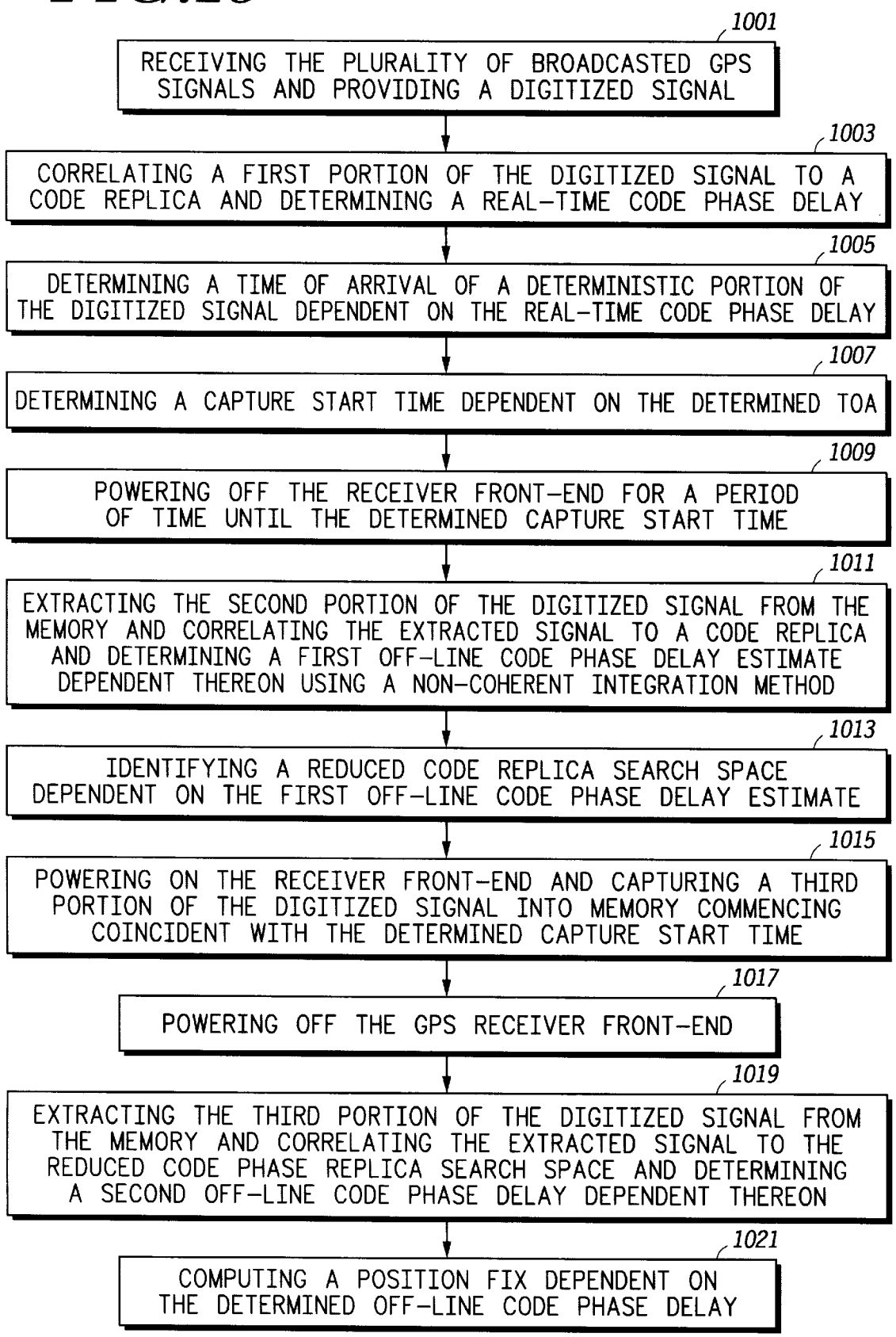
FIG. 10 is a flow chart of preferred method steps illustrating an alternative embodiment of the invention directed toward fast correlation lock using non-coherent integration.

Turning to FIG. 10, in step 1001 a plurality of broadcasted GPS signals are received and a digitized signal is provided.

Next, in step 1003 a first portion of the digitized signal is correlated to a code replica and a real-time code phase delay is determined.

Then, a Time Of Arrival (TOA) of a deterministic portion of the digitized signal dependant on the determined real-time code phase delay is determined in step 1005.

A capture start time is derived from the TOA in step 1007. A second portion of the digitized signal is captured into memory 117 in step 1009. Then, in step 1011 the GPS receiver front-end 104 is powered off. Under the direction of the controller 137, the energy controller 106 keeps the GPS receiver front-end 104 off for a period of time until the determined capture start time.

While waiting for the capture start time to occur, the second portion of the digitized signal is extracted from the memory in step 1013. This second portion is then correlated to the code replica and a first off-line code phase delay estimate is determined using a non-coherent integration method. Note that as mentioned earlier the extraction and correlation rates are 10–100 times faster than in the real-time correlation case because data latency is not a factor in working with captured data.

Next, in step 1015 a reduced code replica search space is derived based on the first off-line code phase delay estimate.

When the determined capture start time occurs the GPS receiver front-end 101 is powered-on and a third portion of the digitized signal is captured into the memory 117 in step 1017.

Then, in step 1019 the third portion of the digitized signal is extracted from the memory 117 and correlated to the reduced code replica search space to determine a second off-line code phase delay.

Finally, in step 1021 a position fix is computed dependent on the determined off-line code phase delay.

In conclusion, an improved GPS signal acquisition method and system, that can operate with weaker signals, lock onto satellite signals fast, and operate with a lower energy usage than prior art schemes has been detailed.

What is claimed is:

1. A method of GPS signal acquisition from a plurality of broadcasted GPS signals comprising the steps of:
    receiving the plurality of broadcasted GPS signals and providing a digitized signal dependent thereon;
    correlating a first portion of the digitized signal to a code replica and determining a real-time code phase delay;
    determining a Time Of Arrival (TOA) of a deterministic portion of the digitized signal, dependent on the determined real-time code phase delay;
    determining a capture start time dependent on the determined TOA;
    capturing a second portion of the digitized signal into a memory commencing coincident with the determined capture start time; and
    extracting the second portion of the digitized signal from the memory and correlating the extracted signal to the code replica and determining an off-line code phase delay dependent thereon.

2. A method in accordance with claim 1 wherein the step of correlating, associated with the step of extracting and correlating, occurs at a rate greater than the step of correlating a first portion of the digitized signal to a code replica.

3. A method in accordance with claim 1 further comprising a step of:
    determining loss of correlation lock, and wherein the step of capturing a second portion of the digitized signal into a memory is executed when the loss of correlation lock is determined.

4. A method in accordance with claim 3 wherein the second portion of the digitized signal captured into memory comprises a plurality of trailing bits of a first GPS satellite broadcast message subframe, and a plurality of bits of a preamble of a second GPS satellite broadcast message subframe immediately following the first GPS satellite broadcast message subframe.

5. A method in accordance with claim 3 wherein the second portion of the digitized signal captured into memory comprises a hand-over word.

6. A method in accordance with claim 5 further comprising a step of determining a real-time Doppler shift dependent on the determined real-time code phase delay.

7. A method in accordance with claim 5 further comprising a step of determining a off-line Doppler shift dependent on the determined off-line code phase delay.

8. A method in accordance with claim 5 further comprising a step of computing a position fix dependent on the determined real-time code phase delay.

9. A method in accordance with claim 5 further comprising a step of computing a position fix dependent on the determined off-line code phase delay.

10. A method in accordance with claim 1 wherein the step of correlating a first portion of the digitized signal comprises a step of correlating a first portion of the digitized signal to a code replica and Doppler replica and determining code phase delays from at least two satellites comprising at least one real-time code phase delay, the method further comprising a step of:
    computing a position fix dependent on at least three code phase delays comprising the determined off-line code phase delay.

11. A method of GPS signal acquisition from a plurality of broadcasted GPS signals comprising the steps of:
    receiving the plurality of broadcasted GPS signals and providing a digitized signal dependent thereon;
    correlating a first portion of the digitized signal to a code replica and determining a real-time code phase delay;
    determining a Time Of Arrival (TOA) of a deterministic portion of the digitized signal, dependent on the determined real-time code phase delay;
    determining a capture start time dependent on the determined TOA;
    deriving a real-time code phase delay prediction dependent on the determined real-time code phase delay and Time Of Arrival (TOA) and identifying a reduced code replica search space dependent thereon;
    capturing a second portion of the digitized signal into a memory commencing coincident with the determined capture start time; and
    extracting the second portion of the digitized signal from the memory and, correlating the extracted signal to the reduced code replica search space and determining an off-line code phase delay dependent thereon.

12. A method in accordance with claim 11 wherein the step of correlating, associated with the step of extracting and correlating, occurs at a rate greater than the step of correlating the first portion of the digitized signal to a code replica.

13. A method in accordance with claim 11 further comprising a step of:
determining loss of correlation lock, and wherein the step of capturing a second portion of the digitized signal into a memory is executed when the loss of correlation lock is determined.

14. A method in accordance with claim 13 wherein the second portion of the digitized signal captured into memory comprises a plurality of trailing bits of a first GPS satellite broadcast message subframe, and a plurality of bits of a preamble of a second GPS satellite broadcast message subframe immediately following the first GPS satellite broadcast message subframe.

15. A method in accordance with claim 13 wherein the second portion of the digitized signal captured into memory comprises a hand-over word.

16. A method in accordance with claim 12 further comprising a step of determining a off-line Doppler shift dependent on the determined off-line code phase delay.

17. A method in accordance with claim 12 further comprising a step of computing a position fix dependent on the determined real-time code phase delay.

18. A method in accordance with claim 12 further comprising a step of computing a position fix dependent on the determined off-line code phase delay.

19. A method in accordance with claim 11 wherein the step of correlating a first portion of the digitized signal comprises a step of correlating a first portion of the digitized signal to a code replica and Doppler replica and determining code phase delays from at least two satellites comprising at least one real-time code phase delay, the method further comprising a step of:
computing a position fix dependent on at least three code phase delays comprising the determined off-line code phase delay.

20. A Global Positioning System (GPS) receiver comprising:
a GPS front-end for receiving a plurality of broadcasted GPS signals and providing a digitized signal dependent thereon;
a first correlator operatively couplable to the front-end for correlating a first portion of the digitized signal to a code replica and determining a real-time code phase delay, then determining a capture start time dependent on the determined real-time code phase delay; and
a memory operably coupled to the front-end for capturing a second portion of the digitized signal into a memory commencing coincident with the determined capture start time, and wherein the first correlator is operably couplable to the memory for extracting the second portion of the digitized signal from the memory and correlating the extracted signal to the code replica and determining an off-line code phase delay.

21. A receiver in accordance with claim 20 further comprising a clock source providing a clock signal to the first correlator, and wherein the determination of the real-time code phase delay is dependent on the clock signal.

22. A receiver in accordance with claim 21 wherein the clock source comprises a two-way communications receiver.

23. A receiver in accordance with claim 22 wherein the two-way communications receiver is one of a CDMA telephone, pager, and other radiotelephone device.

24. A receiver in accordance with claim 20 further comprising:
a second correlator operably coupled to the memory for extracting the second portion of the digitized signal from the memory and correlating the extracted signal to the code replica and determining an off-line code phase delay.

25. A method of GPS signal acquisition from a plurality of broadcasted GPS signals in a GPS receiver with a receiver front-end and a computational back-end, the method comprising the steps of:
powering on the GPS receiver front-end;
receiving the plurality of broadcasted GPS signals and providing a digitized signal dependent thereon;
correlating a first portion of the digitized signal to a code replica and Doppler replica and determining code phase delays from at least three satellites comprising at least one real-time code phase delay;
determining a first position fix dependent on each of the code phase delays and satellite broadcast ephemeris data extracted from the first portion of the digitized signal;
determining a local precise time dependent on the determined first position fix;
determining a satellite signal propagation time for at least one satellite of the at least three satellites;
determining a capture start time dependent on the determined local precise time and the satellite signal propagation time;
determining loss of correlation lock;
powering off the GPS receiver front-end for a period of time until the determined capture start time;
powering on the GPS receiver front-end and capturing a second portion of the digitized signal into memory commencing coincident with the determined capture start time;
powering off the GPS receiver front-end;
extracting the second portion of the digitized signal from the memory and correlating the extracted signal to the code replica, Doppler replica, and a predicted 50 BPS navigation data replica and determining an off-line code phase delay dependent thereon for each satellite signal contained in the second portion of the digitized signal in memory; and
computing a second position fix dependent on at least three code phase delays including the determined off-line code phase delay.

26. A method in accordance with claim 25 wherein the step of correlating, associated with the step of extracting and correlating, occurs at a rate greater than the step of correlating a first portion of the digitized signal to a code replica.

27. A method in accordance with claim 26 wherein the second portion of the digitized signal captured into memory comprises a plurality of trailing bits of a first GPS satellite broadcast message subframe, and a plurality of bits of a preamble of a second GPS satellite broadcast message subframe immediately following the first GPS satellite broadcast message subframe.

28. A method in accordance with claim 27 further comprising the steps of:
determining a real-time Doppler shift dependent on the at least one real-time code phase delay; and
computing a reduced code replica search space dependent on the at least one real-time code phase delay and the real-time Doppler shift, and a time difference between their determination and the determined capture start time.

29. A method in accordance with claim 28 wherein the step of extracting the second portion of the digitized signal from the memory comprises a step of extracting the second portion of the digitized signal from the memory and correlating the extracted signal to the code replica, Doppler replica, and a predicted 50 BPS navigation data replica and determining an off-line code phase delay dependent thereon for each satellite signal contained in the second portion of the digitized signal in memory.

30. A method of GPS signal acquisition from a plurality of broadcasted GPS signals in a GPS receiver with a receiver front-end and a computational back-end, the method comprising the steps of:

receiving the plurality of broadcasted GPS signals and providing a digitized signal dependent thereon;

correlating a first portion of the digitized signal to a code replica and determining a real-time code phase delay;

determining a Time Of Arrival (TOA) of a deterministic portion of the digitized signal, dependent on the determined real-time code phase delay;

determining a capture start time dependent on the determined TOA;

capturing a second portion of the digitized signal into a memory;

powering off the GPS receiver front-end for a period of time until the determined capture start time;

extracting the second portion of the digitized signal from the memory and correlating the extracted signal to a code replica and determining a first off-line code phase delay estimate dependent thereon using a non-coherent integration method;

identifying a reduced code replica search space dependent on the first off-line code phase delay estimate;

powering on the GPS receiver front-end and capturing a third portion of the digitized signal into memory commencing coincident with the determined capture start time; and extracting the third portion of the digitized signal from the memory and correlating the extracted signal to the reduced code replica search space and determining a second off-line code phase delay dependent thereon.

31. A method in accordance with claim 30 wherein the third portion of the digitized signal captured into memory comprises a plurality of trailing bits of a first GPS satellite broadcast message subframe, and a plurality of bits of a preamble of a second GPS satellite broadcast message subframe immediately following the first GPS satellite broadcast message subframe.

32. A method in accordance with claim 31 wherein the second portion of the digitized signal captured into memory comprises a hand-over word.

33. A method in accordance with claim 32 further comprising a step of computing a position fix dependent on the determined off-line code phase delay.

34. A method in accordance with claim 33 wherein the step of correlating a first portion of the digitized signal comprises a step of correlating a first portion of the digitized signal to a code replica and Doppler replica and determining code phase delays from at least two satellites comprising at least one real-time code phase delay, the method further comprising a step of:

computing a position fix dependent on at least three code phase delays comprising the determined off-line code phase delay.

* * * * *